United States Patent
Hyun et al.

(10) Patent No.: US 9,735,611 B2
(45) Date of Patent: Aug. 15, 2017

(54) WIRELESS CHARGING DEVICE FOR VEHICLE

(71) Applicant: SAMSUNG ELECTRO-MECHANICS CO., LTD., Suwon-si (KR)

(72) Inventors: Ji Ho Hyun, Suwon-si (KR); Young Jun Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/145,285

(22) Filed: May 3, 2016

(65) Prior Publication Data

US 2016/0336788 A1 Nov. 17, 2016

(30) Foreign Application Priority Data

May 15, 2015 (KR) .......... 10-2015-0068306
Oct. 1, 2015 (KR) .......... 10-2015-0138725

(51) Int. Cl.
*H02J 7/02* (2016.01)
*H04B 5/00* (2006.01)
*H04M 1/04* (2006.01)
*H02J 7/00* (2006.01)
*H02J 50/10* (2016.01)

(52) U.S. Cl.
CPC .......... *H02J 7/025* (2013.01); *H02J 7/0042* (2013.01); *H04B 5/0081* (2013.01); *H04M 1/04* (2013.01); *H02J 50/10* (2016.02)

(58) Field of Classification Search
CPC .......... H02J 7/00; H02J 7/0052; H02J 7/0025
See application file for complete search history.

(56) References Cited

U.S. PATENT DOCUMENTS

| | | | |
|---|---|---|---|
| 2013/0324198 A1* | 12/2013 | Lachnitt ............ | H04M 1/0202 455/575.9 |
| 2014/0253030 A1* | 9/2014 | Moon .............. | H02J 7/025 320/108 |
| 2015/0002085 A1* | 1/2015 | Fan ................ | H02J 7/0044 320/108 |
| 2016/0068069 A1* | 3/2016 | Percebon .......... | B60L 11/182 307/104 |
| 2016/0149433 A1* | 5/2016 | Hopper ............ | H02J 7/025 320/108 |
| 2016/0276865 A1* | 9/2016 | Pike ............... | B60R 11/0241 |

FOREIGN PATENT DOCUMENTS

| | | |
|---|---|---|
| JP | 2013-169129 A | 8/2013 |
| KR | 10-2010-0133557 A | 12/2010 |
| KR | 10-2015-0028132 A | 3/2015 |
| KR | 10-2015-0032080 A | 3/2015 |

OTHER PUBLICATIONS

Korean Office Action issued Jun. 2, 2016 in counterpart Korean Application No. KR 10-2015-0138725 (14 pages, in Korean, with English language translation).

* cited by examiner

*Primary Examiner* — Tuan Pham
(74) *Attorney, Agent, or Firm* — NSIP Law

(57) ABSTRACT

A wireless charging device includes an external cover to be disposed in an interior of a vehicle, a wireless charging module disposed in the external cover, and an elastic support disposed on a surface of the external cover to elastically support a power receiving apparatus removably inserted between the external cover and the elastic support.

13 Claims, 10 Drawing Sheets

WIRELESS CHARGING DEVICE FOR VEHICLE

CROSS-REFERENCE TO RELATED APPLICATION

This application claims the benefit under 35 USC 119(a) of Korean Patent Application No. 10-2015-0068306 filed on May 15, 2015, and Korean Patent Application No. 10-2015-0138725 filed on Oct. 1, 2015, in the Korean Intellectual Property Office, the entire disclosure of which are incorporated herein by reference for all purposes.

BACKGROUND

1. Field

The following description relates to a wireless charging device for a vehicle in which a portable terminal may be stably mounted.

2. Description of Related Art

Most wireless communications apparatuses require charging. Therefore, portable apparatuses recently released onto the marketplace have featured wired connectors having various configurations.

In order to wirelessly charge a battery pack used in a portable terminal with electrical energy, a terminal connecting scheme and a wireless charging scheme are used. The terminal connecting scheme may involve receiving commercially available power, converting the commercially available power into a voltage and a current appropriate to be provided to the battery pack, and supplying electrical energy through terminals of the corresponding battery pack. The wireless charging scheme may be designed to overcome the inconveniences involved in a wired charging method.

A magnetic resonance scheme and a magnetic induction scheme have been often used in wireless charging technologies. Contactless wireless charging technology using the magnetic induction scheme is widely used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless charging device includes an external cover to be disposed in an interior of a vehicle, a wireless charging module disposed in the external cover, and an elastic support disposed on a surface of the external cover to elastically support a power receiving apparatus removably inserted between the external cover and the elastic support. In this general aspect of a wireless charging device, the elastic support is configured to press the power receiving apparatus to contact the surface of the external cover when the power receiving apparatus is receiving power transmitted by the wireless charging module.

The elastic support may include a fastening portion fastened to the external cover, and an elastic portion extending from the fastening portion to elastically support the power receiving apparatus.

The fastening portion may be fastened to the external cover to be perpendicular to the surface of the external cover.

The fastening portion may be fastened to the external cover to be parallel to a rotational axis of the external cover.

The fastening portion may be fastened to the external cover to be perpendicular to a rotational axis of the external cover.

The elastic portion may be configured to be disposed adjacent to the external cover and may extend from the fastening portion towards the surface of the external cover.

The elastic portion may be configured to elastically support the power receiving apparatus by contacting a surface of the power receiving apparatus.

The general aspect of the wireless charging device may further include at least one catching jaw protruding from an inner surface of the elastic portion.

The elastic support may further include an extended part that extends from the elastic portion, the elastic support being configured to be disposed away from the external cover.

The general aspect of the wireless charging device may further include guide blocks respectively disposed along both sides of the elastic support on the surface of the external cover.

The general aspect of the wireless charging device may further include a magnetic part attached to an inner surface of the elastic support.

The magnetic part may include a ferritic sheet.

The wireless charging module may include a coil part including at least one coil, and a circuit part electrically connected to the coil part to control power applied to the coil part.

The coil part and the circuit part may have thin plate shapes, respectively, and may be embedded in the external cover in a state in which the coil part and the circuit part overlap each other.

In another general aspect, a wireless charging device for a vehicle includes an external cover opening or closing an opening of an accommodation space, an elastic support configured to elastically support a power receiving apparatus removably inserted between a surface of the external cover and the elastic support, and a wireless charging module disposed in the external cover and configured to wirelessly transmit power to the wireless receiving apparatus.

The elastic support may be configured to support the power receiving apparatus so that a surface of the power receiving apparatus contacts the external cover when the wireless charging module is transmitting power to the wireless receiving apparatus.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
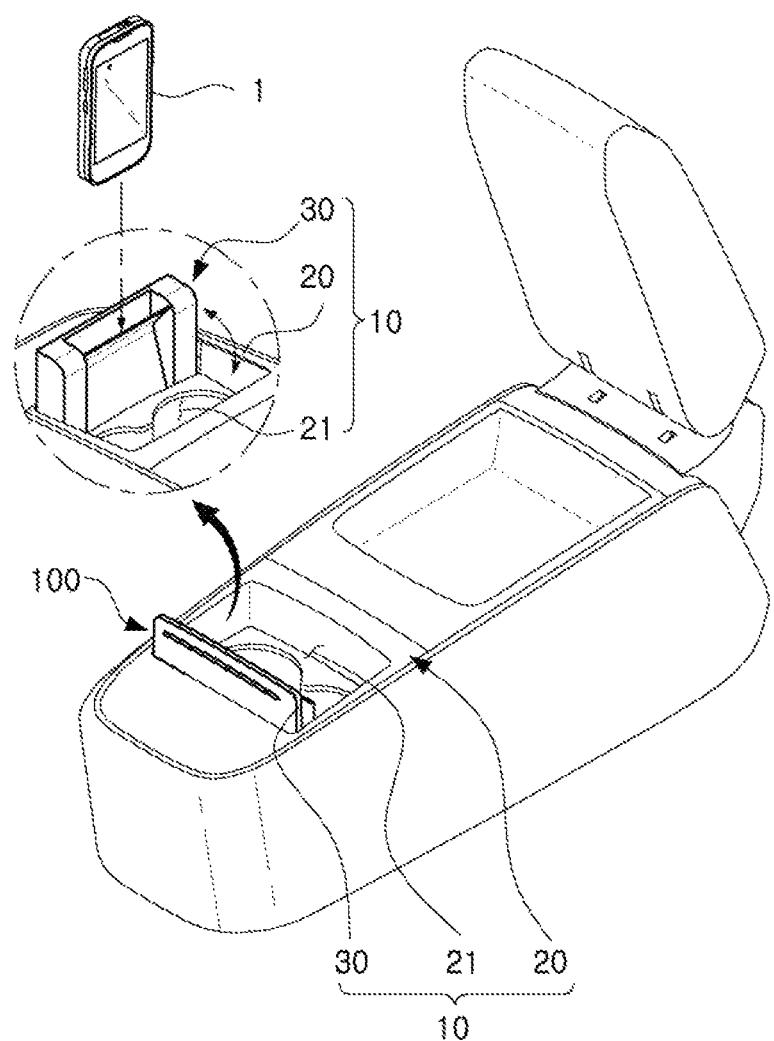
FIG. 1A is a perspective view of an embodiment of a wireless charging device for a vehicle according to the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it is to be understood that when an element, such as a layer, region or substrate, is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, other elements or layers intervening cannot be present. Like numerals refer to like elements throughout. As used herein, the term "and/or" includes any and all combinations of one or more of the associated listed items.

Although terms such as "first," "second," "third," may be used herein to describe various members, components, regions, layers and/or sections, these members, components, regions, layers, or sections are not to be limited by these terms. These terms are only used to distinguish one member, component, region, layer or section from another member, component, region, layer or section. Thus, a first member, component, region, layer or section discussed in embodiments below may also be termed a second member, component, region, layer or section without departing from the teachings of the embodiments.

Spatially relative terms, such as "above," "upper," "below," and "lower" and the like, may be used herein for ease of description to describe one element's relationship to one or more other elements as shown in the figures. It is to be understood that the spatially relative terms are intended to encompass different orientations of the device in use or operation in addition to the orientation depicted in the figures. For example, if the device in the figures is turned over, elements described as being "above" another element or being an "upper" element will then be "below" the other element or will be a "lower" element. Thus, the term "above" can encompass both the above and below orientations depending on a particular direction of the figures. The device may also be oriented in other ways (for example, rotated 90 degrees or at other orientations) and the spatially relative descriptors used herein are to be interpreted accordingly.

The terminology used herein is for describing various examples only and is not to be used to limit the present disclosure. As used herein, the singular terms "a," "an," and "the" are intended to include the plural forms as well, unless the context clearly indicates otherwise. Further, as used herein, the terms "include," "comprises," and "have" specify the presence of stated features, numbers, operations, members, elements, and/or combinations thereof, but do not preclude the presence or addition of one or more other features, operations, members, elements, and/or combinations thereof.

Hereinafter, embodiments of the present disclosure will be described with reference to schematic diagrams. In the drawings, for example, due to manufacturing techniques and/or tolerances, for example, modifications of the shape shown may be estimated. Thus, embodiments of the present disclosure should not be construed as being limited to the particular shapes of regions shown herein, but are to be construed as including changes in shape that occur during manufacturing. The features of the examples described herein may be combined in various ways as will be apparent to one of ordinary skill in the art. Further, although the examples described below have a variety of configurations, other configurations are possible as will be apparent to one of ordinary skill in the art.

Meanwhile, in describing the present embodiment, a power receiving apparatus may include various portable terminals, a smartphone, a mobile phone, a personal digital assistant (PDA), an MP3 player, a tablet personal computer (PC), a portable multimedia player (PMP), or the like.

Wireless charging technology is often used to eliminate the inconveniences involved in establishing a wired connection to charge a battery inside a portable apparatus. However, when a wireless charging device is used inside a vehicle, the portable apparatus may become separated from a cradle of the charging device due to an impact that may occur to the vehicle. Therefore, a wireless charging device in which a portable terminal may be more stably mounted is desirable for use inside a vehicle.

According to an embodiment of the present disclosure, a wireless charging device for a vehicle has been illustrated as being positioned below a central part of a dashboard of the vehicle. However, the present disclosure is not limited thereto. That is, the wireless charging device may be formed in various other positions of a vehicle, such as a center console, an arm rest, and the like.

Figure 1B:
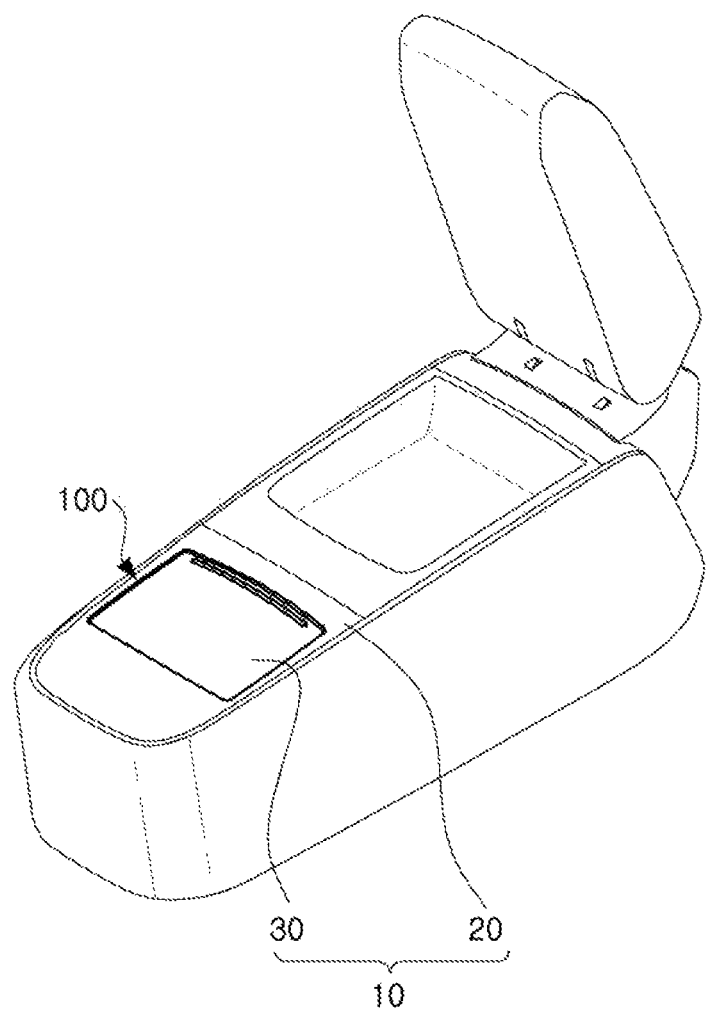
FIG. 1B is a perspective view of an embodiment of the wireless charging device illustrated in FIG. 1A in a state in which a cover is closed.

FIG. 1A is a perspective view schematically illustrating a wireless charging device for a vehicle according to an embodiment in the present disclosure. The wireless charging device is illustrated in a state in which a cover of a reception unit is opened. FIG. 1B is a perspective view illustrating an embodiment of the wireless charging device illustrated in FIG. 1A in a state in which the cover of the reception unit is closed.

Figure 2:
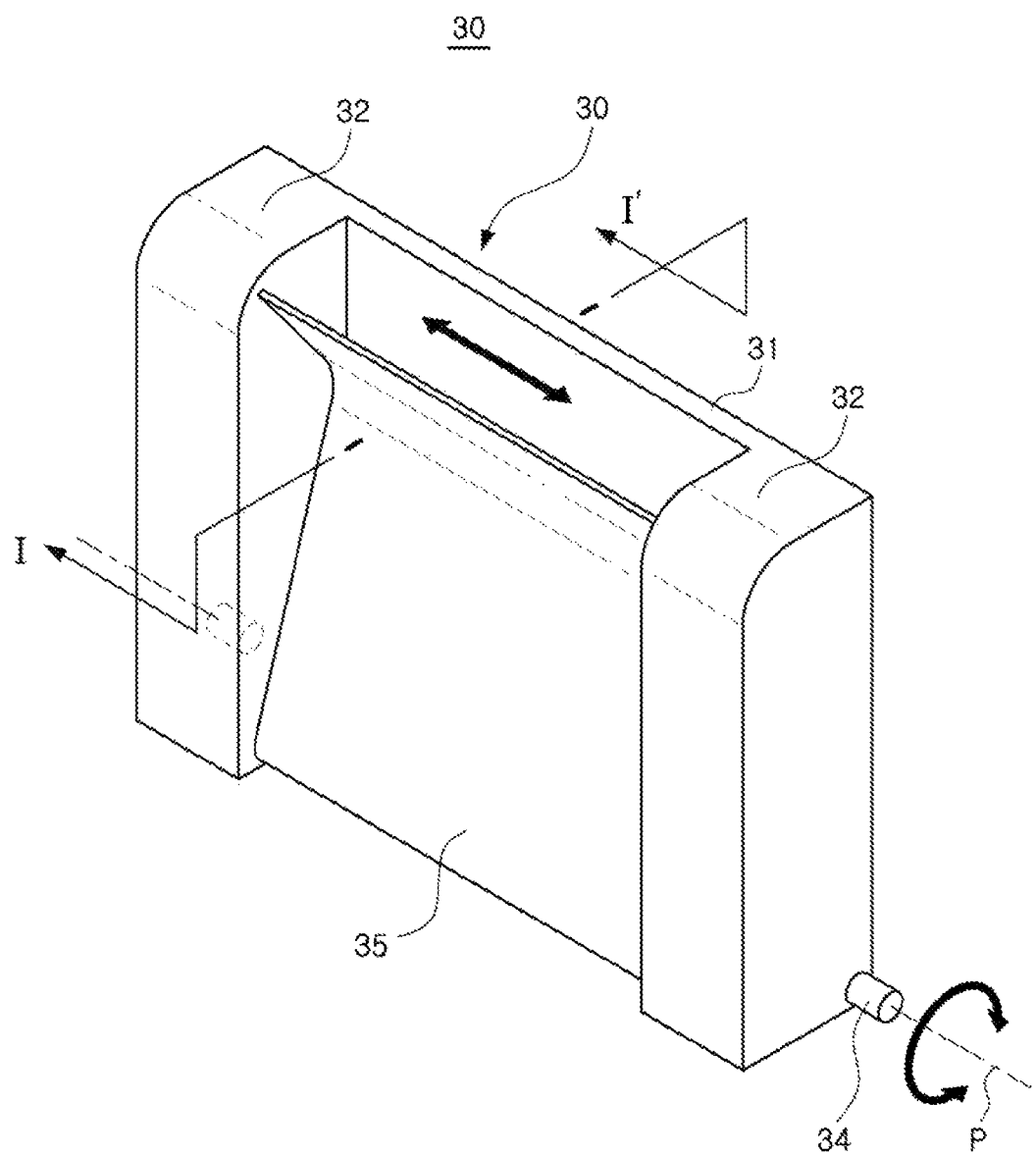
FIG. 2 is a perspective view of an embodiment of a cover of the wireless charging device illustrated in FIG. 1A.
Figure 3:
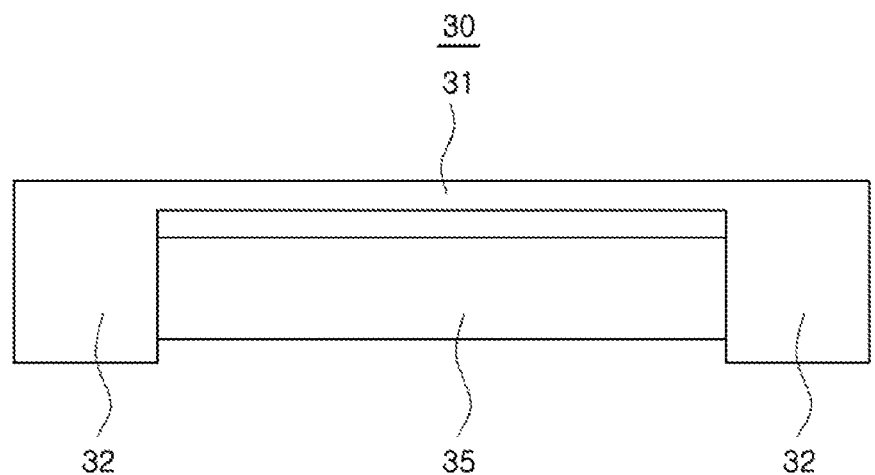
FIG. 3 is a plan view of an embodiment of the cover illustrated in FIG. 2.

In addition, FIG. 2 is a perspective view illustrating an embodiment of the cover illustrated in FIG. 1A, and FIG. 3 is a plan view of an embodiment of the cover illustrated in FIG. 2.

Referring to FIGS. 1A through 3, a wireless charging device 100 for a vehicle is configured as a part of a reception unit 10.

The reception unit 10 may be mounted in an internal structure of the vehicle. For example, the reception unit 10 may be positioned below a central part of a dashboard of the vehicle. In another example, the reception unit 10 may be positioned in another internal structure of the vehicle such as a center console, an arm rest, and the like.

The reception unit 10 includes an accommodation space 21 in which an article may be received. In the example illustrated in FIG. 1A, the reception unit 10 is a cup holder unit in which a cup may be placed.

The reception unit 10 according to the illustrated embodiment includes a reception part 20 and a cover 30, and the wireless charging device 100 for a vehicle is formed integrally with the cover 30 of the reception unit 10. Therefore, the cover 30 itself of the reception unit 10 may be understood as the wireless charging device 100.

The cover 30 may be coupled to the reception part 20 at an opening portion of the accommodation space 21. The cover 30 may be coupled to the reception part 20 to open or close an opening of the accommodation space 21. FIG. 1A illustrates that the cover 30 is coupled to the reception part 20 to be rotatable about a rotational axis through a hinge connection. In this case, the cover 30 is configured to rotate using a hinge 34 (see FIG. 2) about a rotational axis P (see FIG. 2), and open or close the opening of the accommodation space 21.

The cover 30 may be opened and closed through a manual manipulation. However, the cover 30 is not limited thereto, but may also be automatically opened and closed using a driving unit such as a motor, or the like.

Figures 4A, 4B:
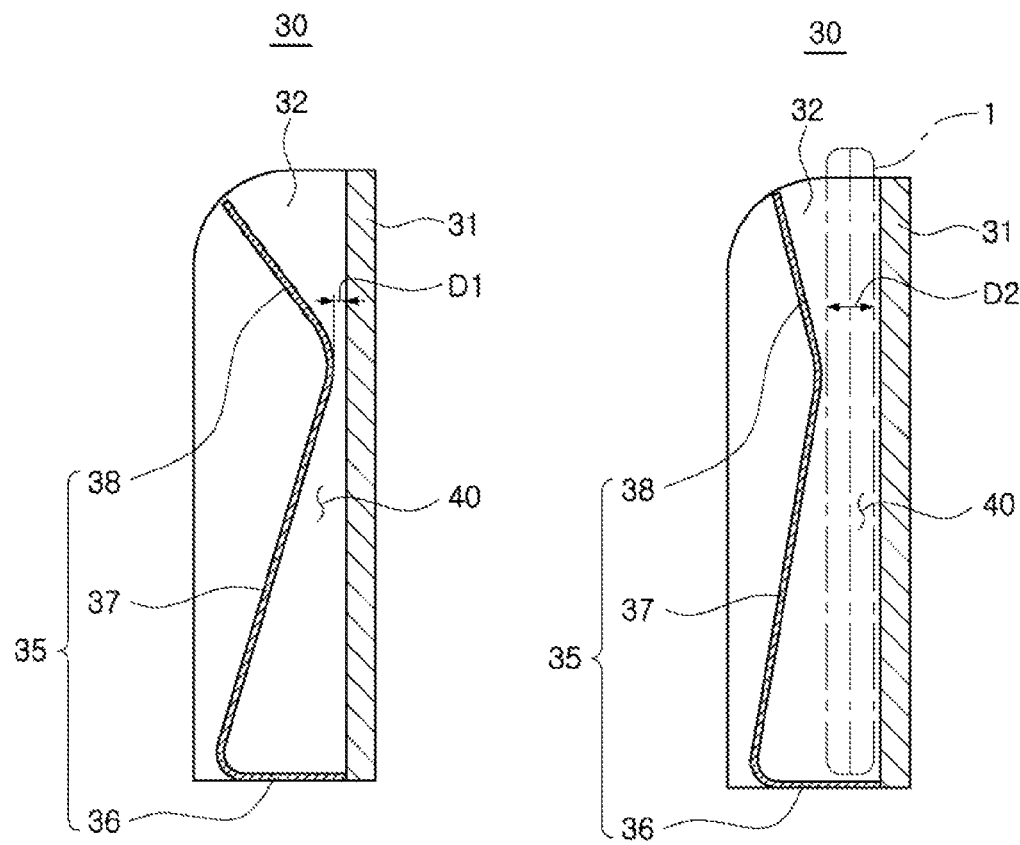
FIGS. 4A and 4B are cross-sectional views of an embodiment of the cover of the wireless charging device taken along line I-I' of FIG. 2.

FIGS. 4A and 4B are cross-sectional views of an embodiment of a cover taken along line I-I' of FIG. 2. FIG. 4A illustrates a state in which no portable terminal is accommodated in an accommodation space, and FIG. 4B illustrates a state in which a portable terminal is accommodated in the accommodation space.

Referring to the embodiment illustrated in FIGS. 4A and 4B, the cover 30 includes an external cover 31 and an elastic support 35.

The external cover 31 refers to a portion exposed to the outside in a case in which the cover 30 closes the reception part 20. For example, the external cover 31 may be a plate disposed as the outermost surface of the cover 30.

According to one example, the external cover 31 includes a wireless charging module 60 (see FIG. 5) disposed therein. The wireless charging module 60 may wirelessly transmit energy to charge a battery of the portable terminal with the energy.

The wireless charging module 60 may be embedded in the external cover 31. For example, the wireless charging module 60 may be completely embedded in the external cover 31 so as not to be identifiable to the naked eye externally. However, the wireless charging module 60 according to the present disclosure is not limited thereto. In another example, the wireless charging module 60 may be partially exposed, as desirable, from the external cover 31.

Figure 5:
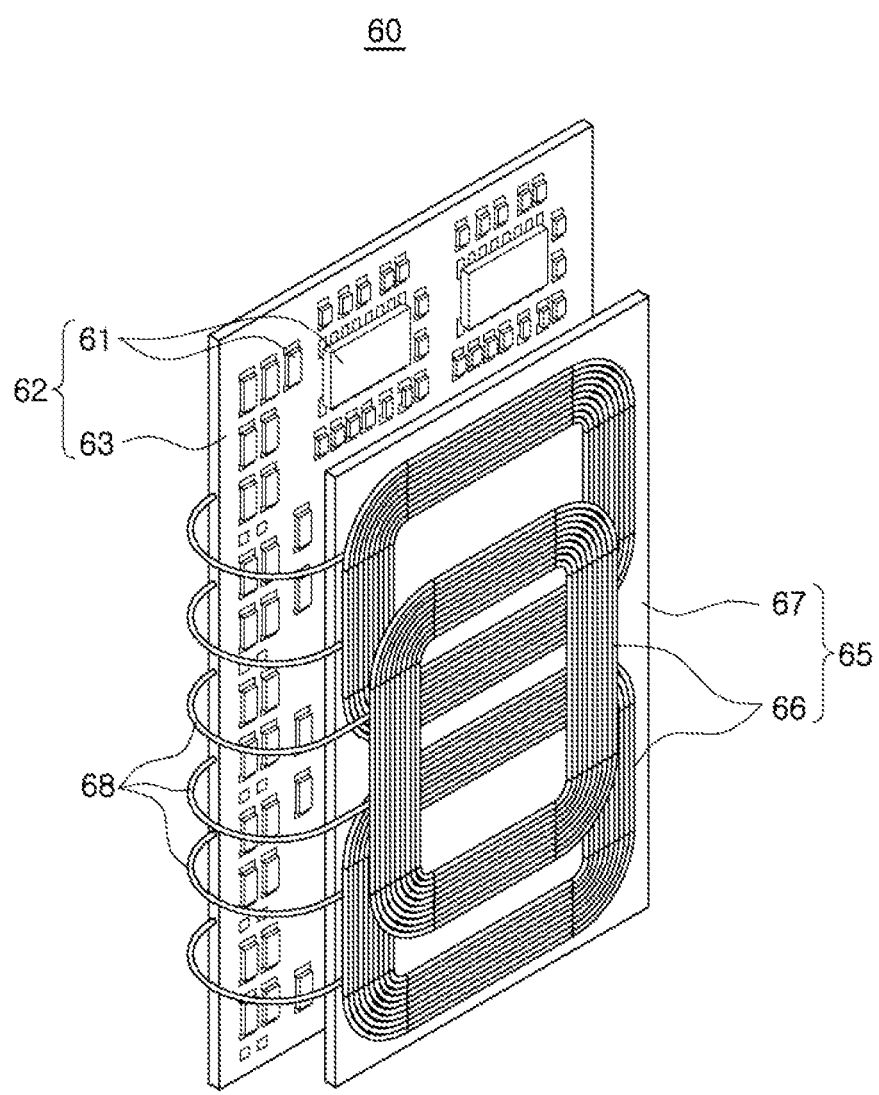
FIG. 5 is a perspective view of an embodiment of a wireless charging module according to the present disclosure.

FIG. 5 is a perspective view schematically illustrating a wireless charging module according to an embodiment in the present disclosure. Referring to FIG. 5, the wireless charging module 60 includes a coil part 65. The coil part 65 includes at least one coil 66 and a circuit part 62 supplying a current to the coil part 65.

The coil part 65 may form a magnetic field depending on a control of the circuit part 62 to radiate wireless electrical energy. To this end, the coil part 65 includes one or more coils 66 attached to a board 67. According to one example, the coil 66 may be a coil having a wire shape. However, the shape of the coil is not limited thereto, but may be variously modified. For instance, the coil may be formed in a conductor pattern shape on the board or be formed of a rectangular copper wire.

The circuit part 62 may be formed by mounting a plurality of electronic elements 61 on a circuit board 63, and may include a circuit controlling charging. Therefore, the coil part 65 may radiate power depending on the control of the circuit part 62 to transmit the power to the portable terminal.

Referring to FIG. 5, the circuit part 62 is electrically connected to the coil part 65 by a connection part 68. In this example, the connection part 68 may be formed of a conducting wire having a wire shape or be formed of a flexible board.

In the wireless charging module 60 according to the embodiment illustrated in FIG. 5, the circuit part 62 and the coil part 65 have thin plate shapes, respectively. The wireless charging module 60 may be embedded in the external cover 31 in a state in which they are stacked and overlapped with each other. In this case, the wireless charging module 60 may be embedded in the external cover 31 so that the coils 66 of the coil part 65 are disposed adjacently to an inner surface of the external cover 31, that is, a charging space 40.

Therefore, an entire area of the wireless charging module 60 may correspond to an area of the circuit part 62 or the coil part 65, and a thickness thereof may correspond to an overall thickness of the circuit part 62 and the coil part 65.

In this embodiment, because the circuit part 62 and the coil part 65 are embedded in the external cover 31 in the state in which they are overlapped with each other, the wireless charging module 60 may be disposed in the external cover 31 without increasing an area of a cover of the cup holder unit according to the related art.

Meanwhile, a thickness of the external cover 31 may also be increased due to the thickness of the wireless charging module 60. However, the thickness of the external cover 31 may be reduced by significantly reducing the thickness of the wireless charging module 60, for example, forming the coil part 65 using a thin film coil.

In addition, as illustrated in FIG. 2, the external cover 31 may have guide blocks 32 formed at both sides thereof, such that the guide blocks 32 protrude toward the elastic support 35. The guide blocks 32 protrude from the inner surface of the external cover 31, and is disposed on both sides of the elastic support 35. Therefore, the elastic support 35 may be disposed between two guide blocks 32.

The guide blocks 32 may limit the movement of the portable terminal 1 in a horizontal direction (see a linear arrow of FIG. 2). To this end, the guide blocks 32 may protrude over entire side surfaces of the elastic support 35. The charging space 40 into which the portable terminal 1 is accommodated may have a groove shape formed between the guide blocks 32 by the guide blocks 32.

Meanwhile, the guide blocks 32 according to the present disclosure are not limited to having the shape described above, but may have various shapes as long as they may suppress the movement of the portable terminal 1 in the horizontal direction. For example, the guide blocks 32 may have a plurality of protrusion block shapes or a pin shape. In another example, the guide blocks 32 may also be omitted.

The guide blocks 32 may be formed of various materials as long as the portable terminal 1 may be stably supported. According to one example, the guide blocks 32 may be formed of a resin material that is the same as or similar to that of the external cover. However, the guide block 32 is not limited to being formed of the resin material, but may also be formed of a metal, a ceramic material, a material such as sponge or foam, or the like.

In addition, the guide block 32 may also be formed of a magnetic material such as ferrite. In this case, the guide block 32 may be used as a magnetic path of a magnetic field generated by the wireless charging module 60, and thus, charging efficiency may be improved.

The elastic support 35 may be disposed inside the external cover 31, and be disposed in the accommodation space 21 in a case in which the cover 30 closes the reception part 20.

The elastic support 35 may be formed by partially bending a flat plate, and have one end fixedly fastened to the external cover 31.

For instance, referring to the embodiment illustrated in FIGS. 4A and 4B, the elastic support 35 includes a fastening portion 36 fixed to the external cover 31, an elastic portion 37 extended from the fastening portion 36 in a surface direction of the external cover 31, and an extended part 38 extended from the elastic portion 37 to be removed from the external cover 31.

The fastening portion 36 may be fixedly fastened to the external cover 31. In the illustrated embodiment, the fastening portion 36 is affixed to the inner surface of the external cover 31 to be approximately perpendicular to the inner surface of the external cover 31.

The fastening portion 36 according to the present embodiment may be fastened to the external cover 31 to be parallel to the rotational axis P (see FIG. 2) of the cover in a position adjacent to the rotational axis P of the cover. Therefore, an opening of the elastic support 35 may be formed on an opposite side to the rotational axis P.

The elastic portion 37, which presses on the portable terminal 1 through elastic force, has one end that extends from the fastening portion 36. In addition, the elastic portion 37 is configured to be disposed adjacent to the external cover 31 toward the other end thereof. In addition, a minimum interval D1 (see FIG. 4A) between the elastic portion 37 and the external cover 31 at its resting state may be narrower than a thickness D2 (see FIG. 4B) of the portable terminal 1 to be placed between the elastic portion 37 and the external cover 31.

Therefore, in a state under which the portable terminal 1 is accommodated between the elastic portion 37 and the external cover 31, the elastic portion 37 may be elastically deformed in a direction away from the external cover 31 by the portable terminal 1, as illustrated in FIG. 4B. In addition, the elastic portion 37 may press the portable terminal 1 by applying the restoring force generated by the elastic deformation, thereby closely pressing the portable terminal 1 to the external cover 31.

In this embodiment, the elastic portion 37 may be elastically deformed as if rotated using a bent line connected to the fastening portion 36 as a rotational axis.

The extended part 38 is formed to extend to an opening portion of the charging space 40 so that a user may easily insert or remove the portable terminal 1 into or from the charging space 40. For example, referring to FIG. 4A, the extended part 38 of the elastic support 35 disposed at the opening of the charging space 40 may be bent in an opposite direction to the external cover 31.

The extended part 38 according to the present embodiment is not limited to having the shape described above, but may have various shapes. In addition, the extended part 38 may also be omitted, if necessary.

In this example, the charging space 40, formed between the elastic support 35 and the external cover 31, refers to a space in which the portable terminal 1 may be accommodated. Therefore, the charging space 40 may be extended or shrunk by deformation of the elastic support 35.

In addition, the wireless charging device 100 according to the present embodiment may include a buffering member (not illustrated) disposed on an inner surface of the external cover 31 or the elastic support 35, a surface contacting the portable terminal.

The buffering member may prevent the portable terminal from sliding, and prevent the generation of scratches in the portable terminal due to direct contact between the portable terminal and the external cover 31 or the elastic support 35.

Therefore, the buffering member may be formed of a rubber material or a sponge material, and be attached in a pad, block, or band shape, but is not limited thereto.

In the wireless charging device for a vehicle according to the present embodiment configured as described above, the battery of the portable terminal may be wirelessly charged while the portable terminal is accommodated in a cover of a cup holder provided in a vehicle. Thus, a space within the vehicle may be efficiently utilized.

In addition, the portable terminal may be stably fixed and mounted so as not to be shaken. Thus, the portable terminal may be easily charged even in a vehicle that is moving.

Further, the portable terminal may be pressed toward the wireless charging module, such that a distance between the portable terminal and the wireless charging module may be significantly reduced. Therefore, the charging efficiency may be improved.

Meanwhile, the present disclosure is not limited to the above-mentioned embodiments, but may be variously modified.

Figure 6A:
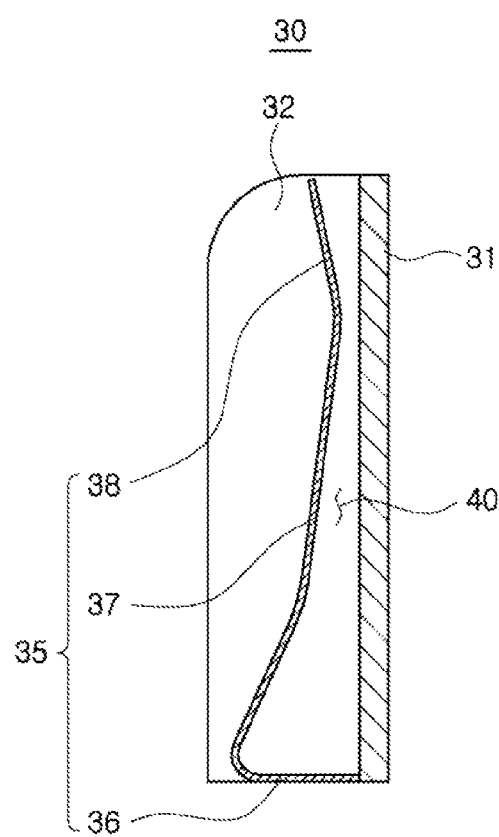
FIGS. 6A and 6B are cross-sectional views of another embodiment of a cover according to the present disclosure.
Figure 6B:
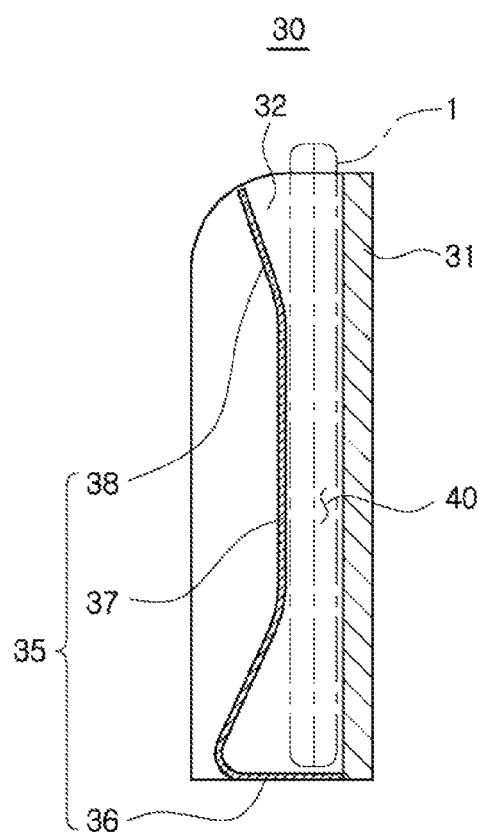

FIGS. 6A and 6B are cross-sectional views of another embodiment of a cover according to the present disclosure. FIG. 6A illustrates a state in which no portable terminal is accommodated in an accommodation space, and FIG. 6B illustrates a state in which a portable terminal is accommodated in the accommodation space.

Referring to FIGS. 6A and 6B, the cover 30 according to the illustrated embodiment is configured so that the elastic portion 37 of the elastic support 35 contacts a surface of the portable terminal 1, pressing the portable terminal 1 into a fixed position. In this case, the elastic support 35 may press the portable terminal 1 over a wide area to more stably fix the portable terminal 1. Therefore, even when an impact is applied to the vehicle, a position at which the portable terminal 1 is held inside the vehicle is not significantly charged due to the impact.

Figure 7A:
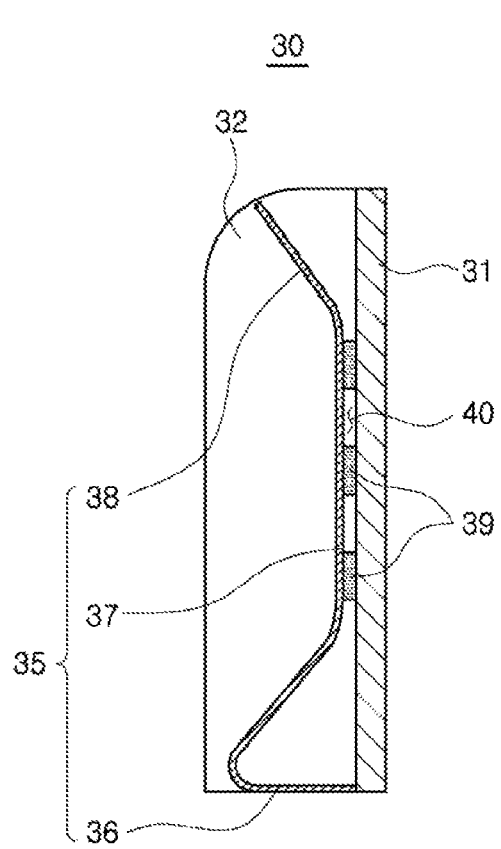
FIGS. 7A and 7B are cross-sectional views of another embodiment of a cover according to the present disclosure.
Figure 7B:
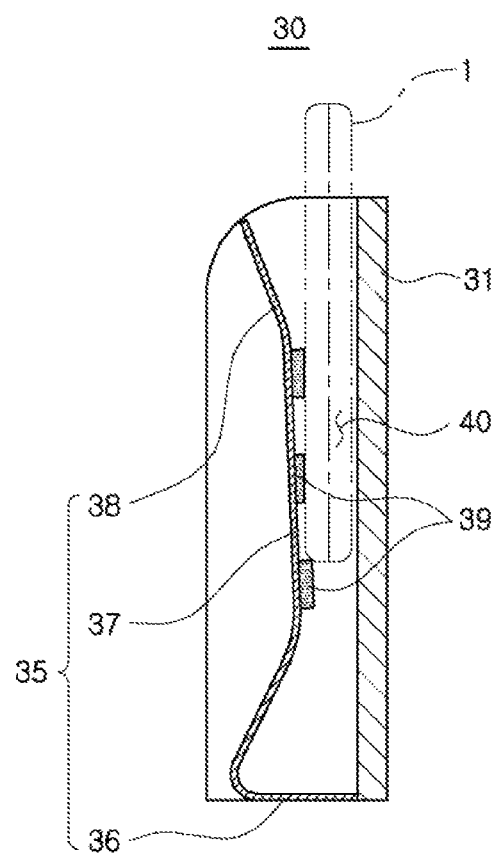

FIGS. 7A and 7B are cross-sectional views of a cover according to another embodiment in the present disclosure. FIG. 7A illustrates a state in which no portable terminal is accommodated in an accommodation space, and FIG. 7B illustrates a state in which a portable terminal is accommodated in the accommodation space.

Referring to the embodiment illustrated in FIGS. 7A and 7B, the cover 30 has at least one catching jaw 39 formed on an inner surface of the elastic portion 37 of the elastic support 35.

The catching jaws 39 are attached to the inner surface of the elastic portion 37 so as to protrude from the inner surface of the elastic portion 37. When the portable terminal 1 is accommodated in the charging space 40, the catching jaws 39 from a contact with the portable terminal 1 to prevent the portable terminal 1 from dropping into the bottom of the charging space 40.

The catching jaws 39 described above may be provided to conveniently accommodate portable terminals having various sizes. For example, when a portable terminal having a small size is placed deep within the charging space 40, it is not convenient to reach into the charging space 40 in order to retrieve the portable terminal. However, when the catching jaws 39 are provided on the inner surface of the elastic portion 37 as in the illustrated embodiment, the portable terminal is held at a desired depth within the charging space 40 while being supported by a specific catching jaw 39, as illustrated in FIG. 7B. Thus, a user may easily select a desired accommodation depth for the portable terminal.

The catching jaws 39 may be formed of a rubber material or a sponge material, and be attached in a pad, block, or band shape, similar to the buffering member, but is not limited thereto.

Figure 8A:
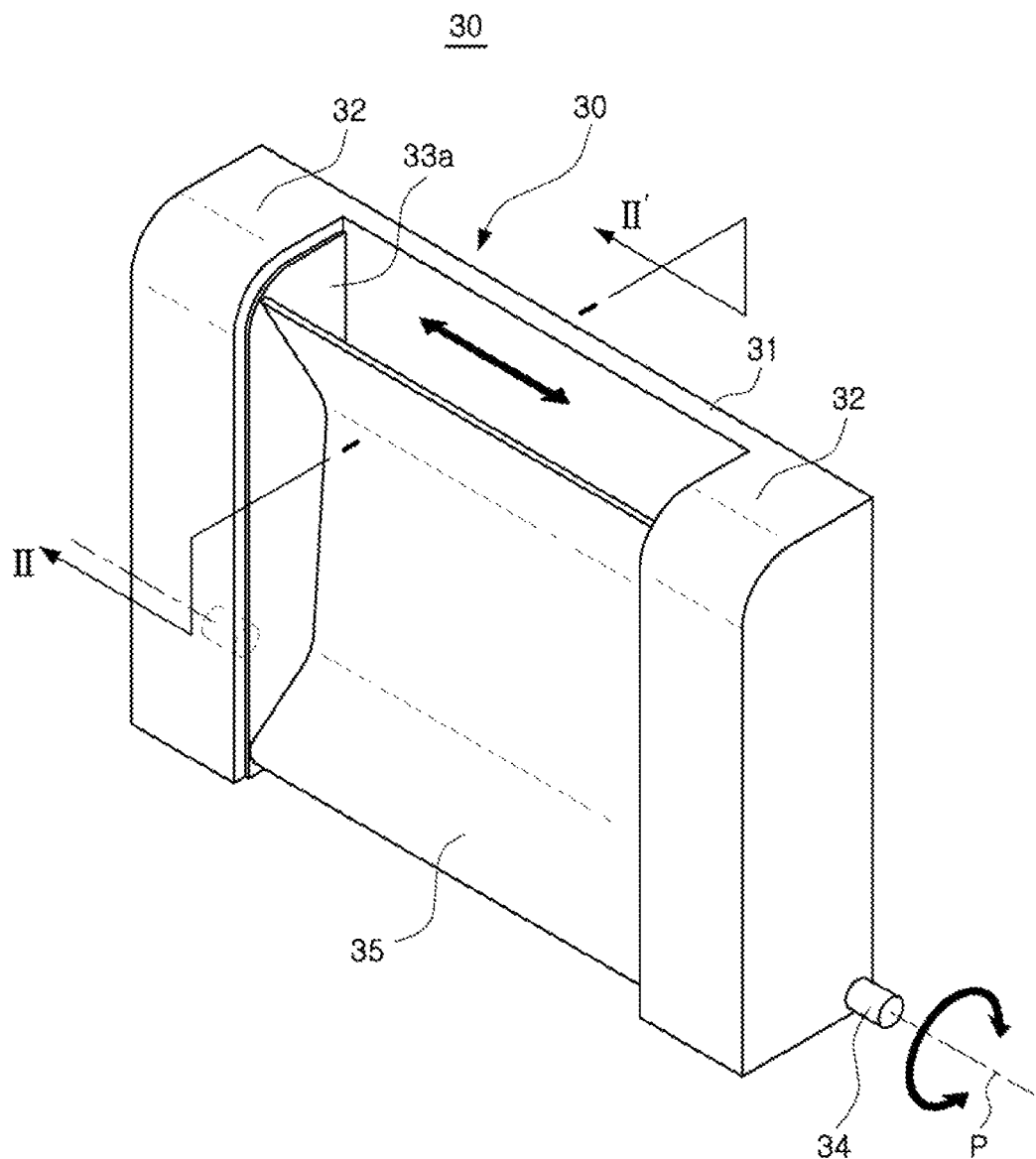
FIGS. 8A and 8B are views of another embodiment of a cover according to the present disclosure.
Figure 8B:
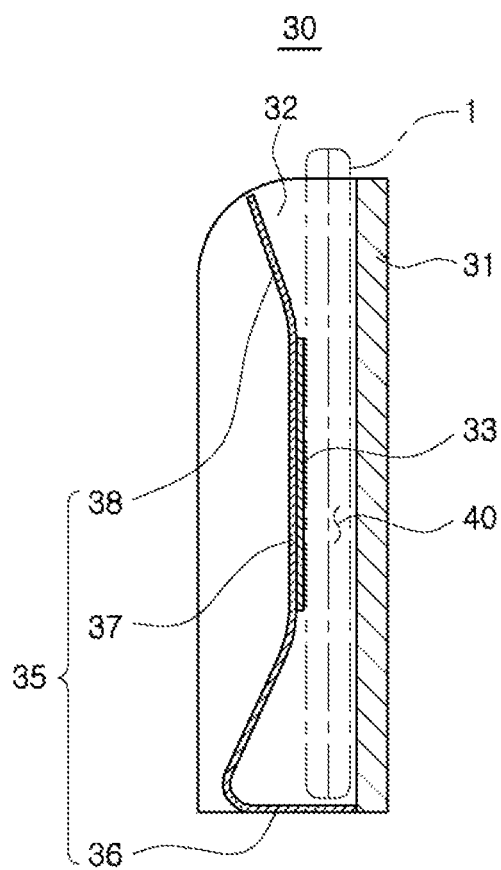

FIG. 8A is a perspective view of another embodiment of a cover according to the present disclosure, and FIG. 8B is a cross-sectional view of the cover taken along line II-II' of FIG. 8A.

Referring to the embodiment illustrated in FIGS. 8A and 8B, the cover 30 includes a magnetic part 33 disposed between the elastic support 35 and the portable terminal. The magnetic part 38 may be formed of various magnetic materials in which a magnetic path may be easily formed, such as ferrite. The magnetic part 38 may have a thin sheet shape and be attached to the inner surface of the elastic support 35.

In this embodiment, the magnetic part 33 is attached to the inner surface of the elastic portion 37. Therefore, the magnetic part 33 may contact a surface of the portable terminal 1 to provide a magnetic path, thereby significantly reducing leakage of magnetic flux.

In addition, in the cover 30 according to the embodiment illustrated in FIG. 8A, a magnetic part 33a is also attached to an inner surface of the guide block 32. However, the cover 30 according to the present disclosure is not limited thereto, but may be variously modified. For instance, in another embodiment, the guide block 32 itself may be formed of a magnetic material, as described above.

Figure 9:
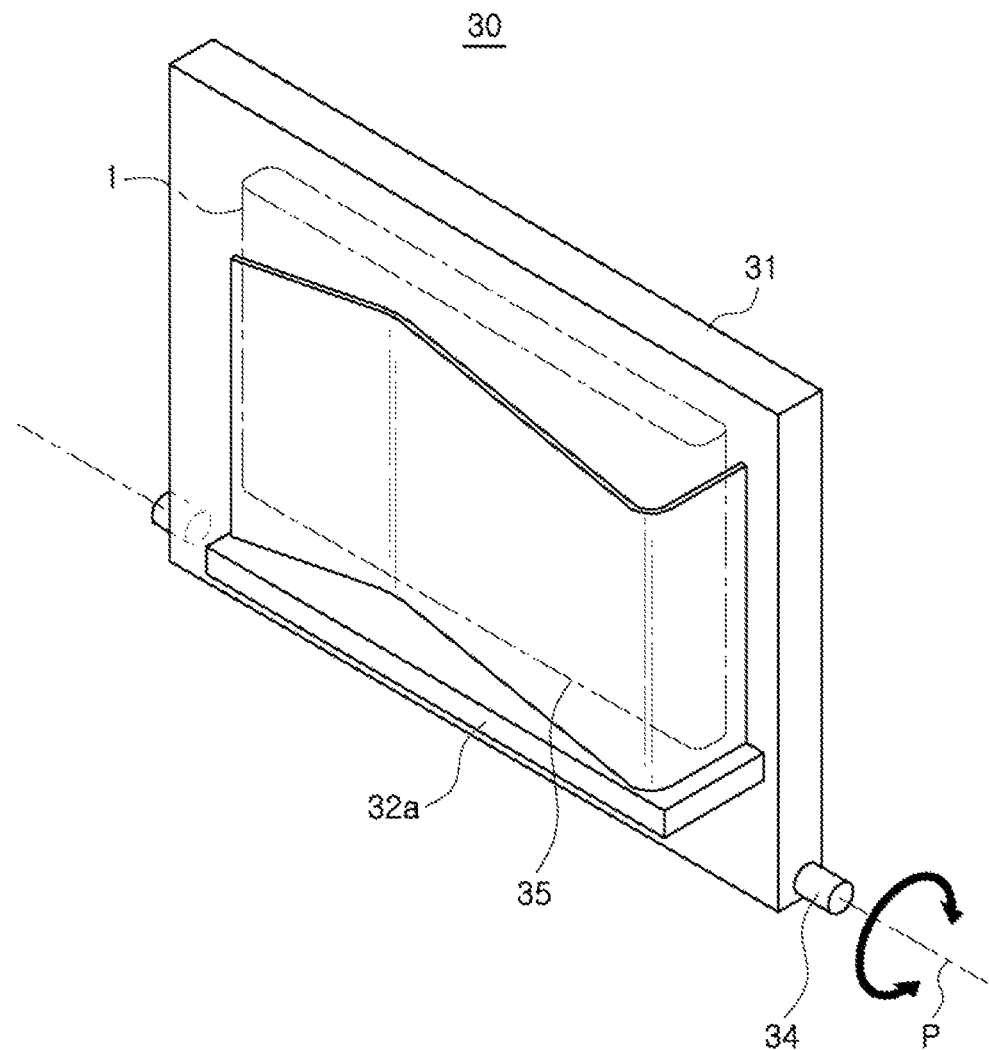
FIG. 9 is a perspective view of another embodiment of a cover according to the present disclosure.

FIG. 9, a perspective view of a cover according to another embodiment in the present disclosure. FIG. 9 illustrates the cover in a state in which a portable terminal is accommodated in an accommodation space.

Referring to the embodiment illustrated in FIG. 9, the elastic support 35 is not fastened to the external cover 31 to be parallel to the rotational axis P. Rather, the elastic support 35 is fastened to the external cover 31 to be perpendicular to the rotational axis P.

Therefore, an opening of the elastic support 35 is formed at a side surface of the external cover 31 rather than an upper surface of the external cover 31 that is opened, and the portable terminal is accommodated in charging space 40 in a length direction of the external cover 31 through the side surface of the external cover 31.

In addition, a support block 32a is disposed at a position adjacent to the rotational axis P in order to support the portable terminal accommodated in the charging space 40. The support block 32a according to this embodiment may be formed of a material similar to that of the guide block 32 described above, and the support block 32a may have various shapes as long as the portable terminal is supported by the support block 32a.

As set forth above, according to embodiments in the present disclosure, the battery of a portable terminal may be wirelessly charged while the portable terminal is accommodated in a cover of a cup holder inside a vehicle. Thus, the space within the vehicle may be efficiently used, and the portable terminal may be stably mounted within a wireless charging device, such that the charging efficiency may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless charging device, comprising:
an external cover to be disposed in an interior of a vehicle, a wireless charging module disposed in the external cover; and
an elastic support disposed on a surface of the external cover to elastically support a power receiving apparatus removably inserted between the external cover and the elastic support, and
a magnetic part attached to an inner surface of the elastic support,
wherein the elastic support is configured to press the power receiving apparatus to contact the surface of the external cover when the power receiving apparatus is receiving power transmitted by the wireless charging module,
wherein the elastic support comprises:
a fastening portion fastened to the external cover;
an elastic portion extending from the fastening portion to elastically support the power receiving apparatus; and
a plurality of catching jaws protruding from the inner surface of the elastic portion, the plurality of catching jaws supporting a lower surface of the portable terminal to prevent the portable terminal from dropping into the bottom of the charging space formed between the elastic support and the external cover.

2. The wireless charging device of claim 1, wherein the fastening portion is fastened to the external cover to be perpendicular to the surface of the external cover.

3. The wireless charging device of claim 1, wherein the fastening portion is fastened to the external cover to be parallel to a rotational axis of the external cover.

4. The wireless charging device of claim 1, wherein the fastening portion is fastened to the external cover to be perpendicular to a rotational axis of the external cover.

5. The wireless charging device of claim 1, wherein the elastic portion is configured to be disposed adjacent to the external cover and extends from the fastening portion towards the surface of the external cover.

6. The wireless charging device of claim 1, wherein the elastic portion is configured to elastically support the power receiving apparatus by contacting a surface of the power receiving apparatus.

7. The wireless charging device of claim 1, wherein the elastic support further comprises an extended part that extends from the elastic portion, the extended part being configured to be disposed away from the external cover.

8. The wireless charging device of claim 1, further comprising guide blocks respectively disposed along both sides of the elastic support on the surface of the external cover.

9. The wireless charging device of claim 1, wherein the magnetic part comprises a ferritic sheet.

10. The wireless charging device of claim 1, wherein the wireless charging module comprises:
   a coil part comprising at least one coil; and
   a circuit part electrically connected to the coil part to control power applied to the coil part.

11. The wireless charging device of claim 10, wherein the coil part and the circuit part have thin plate shapes, respectively, and are embedded in the external cover in a state in which the coil part and the circuit part overlap each other.

12. A wireless charging device for a vehicle, comprising:
   an external cover opening or closing an opening of an accommodation space;
   an elastic support configured to elastically support a power receiving apparatus removably inserted between a surface of the external cover and the elastic support; and
   a wireless charging module disposed in the external cover and configured to wirelessly transmit power to the wireless receiving apparatus,
   wherein the elastic support comprises;
   a fastening portion fastened to the external cover,
   an elastic portion extending from the fastening portion to elastically support the power receiving apparatus,
   a magnetic part attached to an inner surface of the elastic portion, and
   a plurality of catching jaws protruding from the inner surface of the elastic portion, the plurality of catching jaws supporting a lower surface of the portable terminal to prevent the portable terminal from dropping into the bottom of the charging space formed between the elastic support and the external cover.

13. The wireless charging device of claim 12, wherein the elastic support is configured to support the power receiving apparatus so that a surface of the power receiving apparatus contacts the external cover when the wireless charging module is transmitting power to the wireless receiving apparatus.

* * * * *